United States Patent [19]

Latsch et al.

[11] 4,452,189
[45] Jun. 5, 1984

[54] SEPARATELY IGNITED INTERNAL COMBUSTION ENGINE WITH AT LEAST ONE MAIN COMBUSTION CHAMBER AND AN IGNITION CHAMBER ASSIGNED TO IT

[75] Inventors: Reinhard Latsch; Helmut Maurer, both of Vaihingen, Fed. Rep. of Germany

[73] Assignee: Robert Bosch GmbH, Stuttgart, Fed. Rep. of Germany

[21] Appl. No.: 281,621

[22] Filed: Jul. 9, 1981

[30] Foreign Application Priority Data

Jul. 9, 1980 [DE] Fed. Rep. of Germany ....... 3025926

[51] Int. Cl.³ ............................................. F02P 13/00
[52] U.S. Cl. ................................ 123/143 B; 123/275; 123/250; 123/143 R
[58] Field of Search ............... 123/260, 266, 262, 263, 123/285, 291, 275, 250, 254, 255, 41.32, 256, 143 B, 169 PA, 169 PB; 165/124

[56] References Cited

U.S. PATENT DOCUMENTS

| 2,171,929 | 3/1938 | Gazda | 123/254 |
| 3,921,605 | 11/1975 | Wyczalek | 123/143 B |
| 4,029,072 | 6/1977 | Goto et al. | 123/260 |
| 4,077,368 | 3/1978 | Abthoff et al. | 123/260 |
| 4,178,903 | 12/1979 | Yanagihara et al. | 123/260 |
| 4,179,649 | 12/1979 | Karlovitz | 123/263 |
| 4,180,044 | 12/1979 | Sanda et al. | 123/260 |
| 4,204,484 | 5/1980 | Miura | 123/260 |
| 4,232,638 | 11/1980 | Takahashi et al. | 123/260 |
| 4,305,357 | 12/1981 | Scherenberg et al. | 123/263 |
| 4,327,681 | 5/1982 | Latsch et al. | 123/263 |

FOREIGN PATENT DOCUMENTS

| 591465 | 1/1934 | Fed. Rep. of Germany | 123/293 |
| 2842504 | 4/1980 | Fed. Rep. of Germany | 123/266 |
| 43622 | 2/1938 | Netherlands | 123/191 SP |

Primary Examiner—Craig R. Feinberg
Assistant Examiner—David A. Okonsky
Attorney, Agent, or Firm—Edwin E. Greigg

[57] ABSTRACT

A separately ignited internal combustion engine and/or an ignition chamber insert for insertion into the combustion wall of an internal combustion engine is proposed with an ignition chamber which is connected to the main combustion chamber via several overflow channels. The ignition chamber is composed of a forward section with a small, and a rear section with a large diameter into which a straight center electrode protrudes which is surrounded with an insulator in the manner of a common spark plug. The ignition takes place at the transition between the forward section and the rear section between ignition chamber wall and center electrode. The forward section of the ignition chamber is connectable to the main combustion chamber via first overflow channels which discharge tangentially into said forward section and via a second overflow channel discharging coaxially to the ignition chamber insert.

23 Claims, 6 Drawing Figures

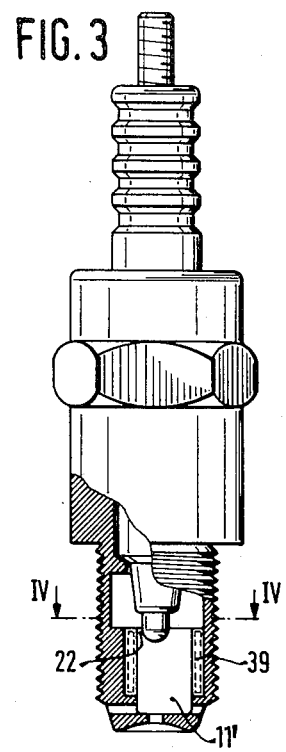
FIG. 3
FIG. 4
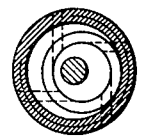
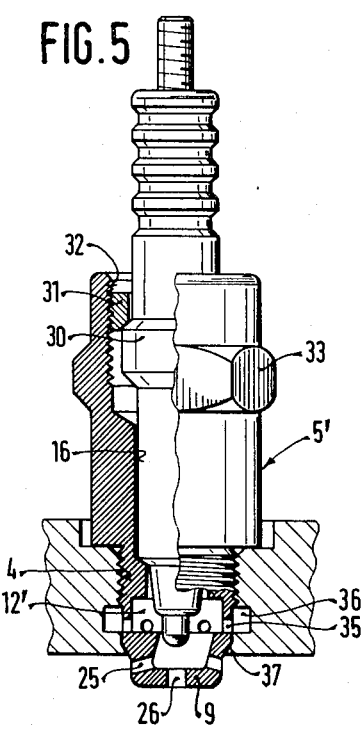
FIG. 5
FIG. 6
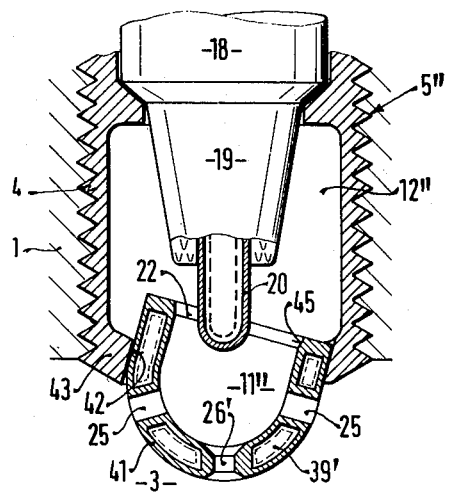

SEPARATELY IGNITED INTERNAL COMBUSTION ENGINE WITH AT LEAST ONE MAIN COMBUSTION CHAMBER AND AN IGNITION CHAMBER ASSIGNED TO IT

BACKGROUND OF THE INVENTION

The invention is based on an internal combustion engine with at least one main combustion chamber and an ignition chamber which is connected with the main combustion chamber via several overflow channels disposed in the first front wall separating the ignition chamber from the main combustion chamber. At least one first overflow channel discharges into the ignition chamber essentially tangentially to the wall of a cylindrical section of the ignition chamber wall. The ignition chamber displays a center electrode provided with an exterior connection and is embedded in an insulator in the manner of a spark plug which shapes an ignition spark distance in a middle area of the longitudinal extension of the ignition chamber towards the ignition chamber wall.

It is to be made possible to maintain a reliable ignition capacity of the mixture in such internal combustion engines (DE-OS No. 28,31,452) with as lean as possible an operation mixture of fuel and air in the internal combustion engine. For this purpose overflow channels are provided which discharge tangentially into the ignition chamber and create a distinct turbulent flow, so that a fuel enrichment at the edge of the turbulence is achieved enhancing the ignition capacity of the inflowing fresh fuel. Furthermore, the ignition takes place within the ignition capacity enhancing stabilized flow in the marginal layer of this turbulent flow. Furthermore, a good preheating of the mixture quantity that is to be ignited there is achieved in this area through a constantly regulated high temperature level. This further enhances the ignition capacity. The temperature regulation takes place with the help of an annular heat pipe disposed in the cylindrical wall of the ignition chamber. To increase the stability of the electrode, the electrode in this known apparatus is provided with heat dissipating means in that the electrode is either embodied as a heat pipe or is enclosed with a reenforced, conical insulator member up to shortly in front of the ignition point. The apparatus thereby has the disadvantage that a separate electrode is needed as an ignition device which, in turn, disadvantageously lessens the volume into which the quantity of residual gas can be forced during the thrusting phase of the fresh mixture into the ignition area with the goal of obtaining a mixture in the area of the ignition as free as possible of residual gas.

OBJECT AND SUMMARY OF THE INVENTION

The ignition chamber according to the present invention has several overflow channels disposed in a first front wall and a second overflow channel, provided in the first front wall, which is aimed at a rear ignition chamber. The ignition chamber is embodied by a forward section with a smaller diameter and an adjoining rear section with a larger diameter.

A foot of an insulator protrudes coaxially into the rear ignition chamber in a conically narrowing fashion. A center electrode, coaxially embedded in the insulator, ends in the forward ignition chamber at the chamber end remote from the first front wall.

The present invention has the advantage that an ignition chamber charge can be used if all requirements are met for the preparation of the relatively lean fuel air mixture, the measurements of which are within the limiting size of spark plugs. Thereby a common rotation symetric plug insulator with a center electrode as is used with spark plugs can be advantageously utilized. The otherwise common housing of the spark plug is modified according to the invention whereby the screw thread and the reach of screw of the common spark plug can be retained.

It is an object of the present invention to provide an apparatus for the ignition of very lean fuelair mixtures which is arranged to be used within a common spark plug.

Another object of the invention is to provide an apparatus with a center electrode shaped to keep flow disturbance at the area of ignition to a minimum.

An additional object of the invention is to provide an apparatus with an ignition chamber positioned to define the length of the ignition spark distance.

A further object of the invention is to provide an apparatus with a device having overflow channels which insure optimum fuel ignition.

A still further object of the invention is to provide an apparatus having heat pipes to control temperature fluctuations in the ignition area.

The invention will be better understood and further objects thereof will become more apparent from the ensuing detailed description of four preferred embodiments taken in conjunction with the drawings.

BRIEF DESCRIPTION OF THE DRAWINGS

FIG. 3 shows an ignition chamber insert according to a second exemplary embodiment in longitudinal cross section;

FIG. 4 shows the injection chamber of the exemplary embodiment according to FIG. 3 in cross section;

FIG. 5 shows a third exemplary embodiment of an ignition chamber insert in longitudinal cross section; and FIG. 6 a fourth exemplary embodiment in cross section.

DESCRIPTION OF THE PREFERRED EMBODIMENTS

Figure 1:
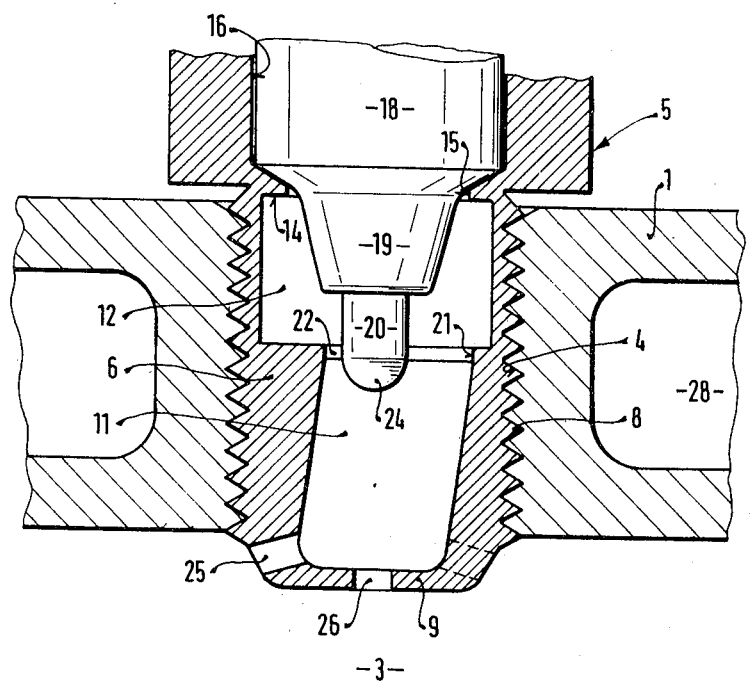
FIG. 1 shows a first exemplary embodiment of the invention in cross section.

FIG. 1 shows a section of the combustion chamber wall 1 which limits the main combustion chamber 3 of an internal combustion engine. A bore 4 provided with an internal thread is disposed into this section of the combustion chamber wall 1. An ignition chamber insert 5 is screwed into the bore 4. A cylindrical section 6 of the ignition chamber insert displays an external thread 8 adjacent to which the ignition chamber insert displays a section 9 shaped as a truncated cone protruding into the main combustion chamber 3. This section 9 essentially represents a first front wall of an ignition chamber arranged in the interior of the circular cylinder section 6. The ignition chamber in this case is embodied by a forward section 11 and a rear section 12. The forward section 11 has the shape of an inclined circular cylinder, the front circle basis of which is situated concentrically to the axis of symmetry of the ignition chamber insert and is formed by the first front wall 9. The forward section 11 discharges into the rear section 12, which has a circular cylinder shape as well, and is arranged coaxially to the axis of symmetry of the ignition chamber insert. The elongation of the rear section is somewhat less than that of the front section, whereas the diameter of the rear section is somewhat larger than that of the forward section. On the other front side 14 of the ignition chamber, the front side limiting the rear section, a concentric penetration 15 is provided which adjacently expands into a bore 16 into which an insulator 18 is tightly fitted.

The insulator 18 displays an insulator foot 19, which is executed in the form of a truncated cone and protrudes into the rear section 12 of the ignition chamber and encloses a center electrode 20 in its longitudinal axis. The insulator 18 with its center electrode 20 is essentially executed in the same fashion as the plug insulator of a common spark plug. As a whole it is a rotationally symmetric body which is inserted coaxially into the ignition chamber insert 5. In further modifications it can be interchangeably fastened as shown in the examples according to FIGS. 3 and 5.

The center electrode 20 protrudes through the rear section 12 of the ignition chamber into the adjacent forward section 11. At the transition between the forward section 11 and the rear section 12 of the ignition chamber the forward section 11 converts into a straight circular cylinder 21 which only has very little height and displays the same diameter as the forward section 11. In the area of this straight circular cylinder 21 the largest radial approach of the ignition chamber wall to the center electrode 20 exists. This location represents the ignition spark distance 22. Starting from this location the center electrode terminates in a rounded cone 24 which is intended to keep a disturbance of the flow in the area of the ignition points by the gas stream aimed at the ignition electrode as minimal as possible.

Figure 2:
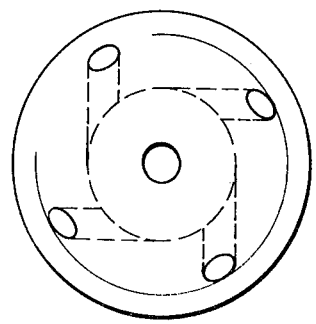
FIG. 2 shows the ignition chamber insert according to FIG. 1 in cross section.

The front section of the ignition chamber is connected to the main combustion chamber via first overflow channels 25 which are disposed in the first front wall and essentially discharges tangentially into the cylindrical wall of the forward section 11 of the ignition chamber. The channel direction can be seen clearly in FIG. 2. From FIG. 1 we know that the channels are disposed slightly ascendently. Furthermore, a second overflow channel 26 is provided in the first front wall which is coaxial to the axis of the ignition chamber charge and/or the rear section 12 and is directed into the rear section of the ignition chamber. The overflow channel 26 can also be positioned parallel to the axis of the forward section 11 of the chamber so as not to disturb the ordered turbulence flow in the region of the ignition point.

It should be mentioned that the combustion chamber wall 1 can be, for example, the cylinder head of an internal combustion engine and is cooled in the usual fashion. For this chambers 28 can be provided in the combustion chamber wall with cooling liquid flowing through them.

The load of fuel and air transported into the main combustion chamber 3 during the suction stroke of the internal combustion engine is forced into the ignition chamber during the following compression stroke via the overflow channels 25 and/or 26. The mixture quantity flowing in via the second overflow channel 26 thereby flows directly into the rear section 12 of the ignition chamber, past the streamlined executed head of the center electrode 20 and the insulator foot 19 surrounding it. A reversal of the flow then takes place in the rear section 12 on the other front side 14. Simultaneously, the other quantity of the mixture enters the first section 11 of the ignition chamber via the tangentially disposed overflow channels 25. Due to the conduction of the first overflow channels the inserted mixture is brought into a rotating and helically ascending motion so that an ordered turbulent flow is formed along the cylindrical wall of the forward section 11 of the ignition chamber which surrounds the mixture flow entering via the second overflow channel 26. Due to the high rotation speed of the lean mixture quantities an enrichment with fuel takes place in the rear near the wall. The enriched mixture further warms up, especially in the stabilized marginal layer of the wall on the cylindrical wall of the forward section 11 of the ignition chamber which further enhances the ignition capacity of the mixture. Through this arrangement the axial motion component of the rotating mixture mass is advantageously dampened all the more the closer these mixture quantities approach the center electrode 20 and/or the ignition spark distance 22 as the influence of the mixture quantity, having streamed in via the second overflow channel 26 and crowding back again, becomes effective. In the area of the ignition spark distance 22 only a rotary motion of the mixture quantity that flowed in via the first overflow channels 25 lastly appears towards the end of the compression stroke, so that a long period of dwell at the warm ignition chamber wall enhances the preparation to an ignitable mixture.

This arrangement allows the forming of an ignition spark distance toward the wall of the ignition chamber with the help of a common spark plug electrode inserted coaxially into an ignition chamber insert, whereby the spark ignites the mixture contained in the ignition chamber within the stabilized area of the marginal layer of the wall where the mixture is still optimally prepared. By means of this described apparatus it is furtheremore possible to realize an ignition chamber insert that essentially has the outer form of the housing of a common spark plug, whereby the common spark plug thread can accordingly be used in the combustion chamber wall of an internal combustion engine. Therewith it is possible to reequip such an ignition chamber charge as an ignition arrangement for lean air mixtures with internal combustion engines. The effect of such small ignition chambers is based on the recognition that smallest mixture quantities are already sufficient to ignite large lean mixture quantities after inflamation, especially with the help of the flame jets flowing into the main combustion chamber via the overflow channels. Furthermore, only a small mixture quantity is necessary, once again, within the ignition chamber to set alight the load within the ignition chamber. Thereby, with choice of the optimal ignition point according to the invention, remnant gas quantities in the ignition chamber can be taken into account as well, as the ignition point is particularly advantageously flushed clean of these quantities. With the help of such an ignition chamber very regular pressure distributions are possible in an internal combustion engine operation with lean operation mixture via the retarded combustion but also during the heating up and idling of the internal combustion engine. The arrangement displays a negligible knocking tendency and the advantage that the fuel consumption and the emission of detrimental substances is lowered.

If an ignition chamber of the described form can also be integrated into the combustion chamber wall, then considerable advantages are offered if such an ignition chamber is disposed in an interchangeable ignition chamber insert. In case of a failure of the ignition chamber or of the ignition apparatus it is thus possible to replace the insert or the insulator with a center electrode 20 in an easy fashion.

FIG. 5 shows a modified construction of the ignition chamber insert 5 according to FIG. 1. In a similar manner to the preceeding preferred embodiment, an insulator or a plug insulator 18 is fitted into a bore 16 in the housing of the ignition chamber insert 5' whereby the plug insualtor displays a shoulder 30 on to which axial auxiliary forces can be transmitted with the help of a screw ring 31. Thereby the screw ring 31 is screwed into a tapped hole 32 adjacent to the bore 16. The ignition chamber charge displays a hexagon on the exterior with which the ignition chamber insert 5' can be screwed into the (tapped) bore 4.

Diverging from the construction according to FIG. 1, the rear section 12 of the ignition chamber of this preferred embodiment displays radial penetrations 35 which lead into a ring chamber 36 which is embodied by an annular groove provided at the threading location in the combustion chamber wall 1 and the surface of the screwed in ignition insert 5'. Adjacent to the ring chamber 36 the bore 4 tapers conically in the direction of the main combustion chamber and thereby forms a cone seat 37 for the corresponding conically tapering front wall 9 of the ignition chamber insert shaped as a trucated cone. In this way the ring chamber 36 is sealed toward the main combustion chamber 3. Furthermore, the cone seat 37 in advantageous manner has the characteristic of enhancing the heat transmission from the front side, i.e. from the conical section. With a small construction of the ignition chamber charge it is thus possible to store sufficiently large mixture quantities behind the ignition point, that is, in the rear section 12' and in the ring chamber 36. In this manner the energy of the igniter or the flame jet flowing out of the overflow channels 25 and/or 26 into the main combustion chamber 3 can be increased. Naturally, a chamber of optional design can also be disposed behind the chamber section 12 instead of a ring chamber.

A further preferred embodiment according to FIG. 3 is essentially executed the same as the preferred embodiment according to FIG. 1. Only here a straight cylinder is provided instead of an inclined cylinder for the forward section 11 of the ignition chamber which, however, is now disposed eccentrically to the longitudinal axis of the ignition chamber charge. Due to the smaller diameter of the forward section 11' of the combustion chamber it is achievable in this manner that the necessary small distance to the wall of the ignition chamber can be retained regardless of the coaxial center electrode. In a further embodiment an annular heat pipe 39 is also provided which is disposed in the cylindrical wall of the forward section 11' of the ignition chamber. Such a basically known heat pipe offers the excellent possibility of preventing the heat transport to the cooled combustion chamber walls in the still cold condition of the combustion chamber and of avoiding an overheating of the ignition chamber walls since the heat pipe functions to dissipate heat in a warmed up ignition chamber. Due to the heat pipe an optimal highest temperature is retained. Therefore, especially the mixture quantities that are guided to the area of the ignition spark distance 22 for the first combustion are optimally warmed up. Such a heat pipe can naturally also be used in the other described preferred embodiments.

Heat pipes are basically known and function according to the principle that the liquid medium contained within transforms into a steam like condition as of a certain temperature, whereby the steam condenses again at the cooler sections of the heat pipe. The condensed matter is transported back to the point of evaporation via a capillary structure disposed on the walls of the heat pipe. A heat pipe of this type is disclosed in U.S. Pat. No. 3,229,759 to G. M. Grover.

The center electrode 20 can be embodied as a heat pipe, as well, in the shown preferred embodiments in an advantageous manner. This creates the advantage that the electrode can protrude relatively far into the ignition chamber without being prematurely destroyed despite the high heat stress of the ignition chamber. In this case the electrode has a hollow chamber on the inside which extends into the heat dissipation zones of the ceramic surrounding of the center electrode. The evaporation zone of the heat pipe in the center electrode 20 is then located in the area of the ignition chamber, while the condensation zone is located in the area of the electrode surrounded by heat dissipating ceramic.

A fourth preferred embodiment of the invention is shown in FIG. 6. There, once again, a section of the combustion chamber wall 1 is shown, which limits the main combustion chamber 3 of an internal combustion engine. A continuous bore 4, furnished with an internal thread, is provided in this section of the combustion chamber wall into which an ignition chamber insert 5" is screwed. In the cylindrical section of the ignition chamber insert provided with a screw thread, a rear section 12" of the ignition chamber is provided in the interior. This rear section 12" is arranged cylindrically and coaxially, as well, and the insulator 18 fastened coaxially to the ignition chamber insert 5" with the insulator foot 19, executed as a truncated cone, protrudes into it. In its longitudinal axis the insulator surrounds the center electrode 20 and thus correlates precisely to the arrangement described in the previous preferred embodiments.

Diverging from the embodiment according to FIG. 1 the forward section 11" of the ignition chamber is embodied by a bowl shaped member 41. This displays a cylindrical chamber section in its interior which is closed off by a chamber section shaped like a hemisphere. The bowl shaped member 41 is inserted into an opening 42 in a wall 43 limiting the rear section 12" of the ignition chamber toward the main combustion chamber 3 and tightly connected with the ignition chamber charge 5". In the shown preferred embodiment according to FIG. 6 the exterior shape of the bowl shaped member 41 is axially symetrical whereby the member is inserted into the opening 22 inclined toward the longitudinal axis of the center electrode and/or ignition chamber insert and discharges into the rear section 12" of the ignition chamber with its open side. A phase 45 is provided on the inner edge of the open side of the bowl shaped member 41. The plane of the phase 45 thereby is situated at the location at which exists the smallest distance between center electrode 20 and inner edge of the bowl shaped member 41 parallel to the longitudinal axis of the center electrode. Thereby the inclination of the bowl shaped member 41 defines the narrowest distance to the center electrode which forms the ignition spark distance 22 at this location. In a similar arrangement as in the preferred embodiment according to FIG. 3 the ignition chamber wall in the forward section 11" of the ignition chamber is temperature regulated via a heat pipe 39'. The heat pipe thereby extends, in advantageous manner, solely to the walls of the bowl shaped member. In this the overflow channels 25 and 26 are provided as well, whereby the first overflow channels 25 are alligned such, taking the inclined position of the bowl shaped member into consideration, that they comply with the demands of the respective combustion chamber, that is, that the outflowing flame jets are in the position of optimally setting afire the fuel air mixture located in the main combustion chamber 3. The axes of these first overflow channels form angles of 10–40 degrees together with the plane vertical to the longitudinal axis of the center electrode 20 or from a middle plane which is parallel to the main combustion wall. The inclination of the bowl shaped member 41 can furthermore display an angular deflection of 5–30 degrees from the longitudinal axis of the center electrode under the condition that the ignition chamber charge is inserted vertically to the wall of the combustion chamber.

As first overflow channel preferrably the overflow channel 26' is provided coaxially to the center electrode. This overflow channel 26', differing from the arrangement of the previous preferred embodiments, conically widens in diameter on the side of the combustion chamber as well as on the side of the ignition chamber. Due to this embodiment the length of the first overflow channel 26' is kept very short with the intent of achieving a quick rupture of the flame during the exhaust of the ignited fuel air mixture out of the ignition chamber. The edge of the member 41 protruding into the rear section 12" of the ignition chamber due to the inclination of the bowl shaped member 41 is acted upon on two sides by combustion gases so that this combustion chamber section especially warms up well. This is especially advantageous as the ignition spark from the center electrode 30 jumps to this edged section. Therefore the mixture to be alighted can be intensely warmed up in the ignition area and prepared for enhanced ignition capacity. The described embodiment can also be produced in one piece as well instead of with an inserted member 41. The following measurement proportions apply to all previous preferred embodiments which are inserted into ignition chamber charges and which display a thread diameter which corresponds to the thread diameter of common spark plugs:

1. The proportion of the total volume of the ignition chamber to the compression volume of the main combustion chamber is between 0.01 and 0.05.

2. The proportion of the volume of the forward section 11 and/or 11" of the ignition chamber to the volume of the rear section 12 and/or 12" is between 1.5 and 4.

3. The proportion of the total cross-sectional area of the overflow channels to the volume of the turbulence chamber has a value between 0.03 and 0.1 cm$^{-1}$.

4. The proportion of the cross-sectional area of the forward section of the ignition chamber to the cross-sectional area of the rear section of the ignition chamber is 0.2–0.5.

5. The relation of diameter to length of overflow channels is to be in the area of 0.8–2.

6. The diameter of the second overflow channel 26 and/or 26' is to be 0.8–3 mm.

7. The proportion of the length of the forward section 11, 11', and/or 11" to the length of the rear section 12, 12', and/or 12" is between 0.3 and 1.

With these measurements and specific embodiments an apparatus for the ignition of very lean fuel air mixtures with ignition chambers can be achieved which can be accomodated in an ignition chamber insert having a thread diameter not larger than that of common spark plugs. Furthermore, with this arrangement a 'plug insulator' or insulator 18 as is common with spark plugs can advantageously be used with a center electrode which has the normal exterior spark plug connection for the ignition voltage.

The foregoing relates to preferred exemplary embodiments of the invention and it will be understood that numerous other embodiments and variants thereof are possible within the spirit and scope of the invention, the latter being defined by the appended claims.

What is claimed and desired to be secured by Letters Patent in the United States is:

1. An internal combustion engine operating with externally supplied ignition having at least one main combustion chamber, which adjoins a first wall, and having at least one ignition chamber, which has two ignition chamber sections communicating at a transitional zone, of which a rear ignition chamber section has a first diameter and a forward ignition chamber section has a second diameter, which is smaller than the first diameter, and the forward ignition chamber section adjoins a front wall, in which a number of overflow conduits are located, which connect the ignition chamber with the main combustion chamber and of which at least one overflow conduit is oriented at a tangent to the second diameter of the forward ignition chamber section and another overflow conduit is oriented substantially parallel to the longitudinal axis of the rear ignition chamber section, and having an ignition device including;

an electrode embodied in a straight form, which is carried by an insulator protruding with a conical foot into the rear ignition chamber section, wherein said electrode extends into the forward ignition chamber section; and a counterelectrode oriented toward the straight electrode, which counterelectrode is formed in the vicinity of the transitional zone by a circumferential wall of the forward ignition chamber section and from which an ignition spark gap begins and which terminates at the straight electrode, characterized in that the straight electrode is oriented coaxially with the rear ignition chamber section and that the second diameter of the forward ignition chamber section, in the vicinity of the ignition spark gap, is oriented eccentrically relative to the straight electrode, the shortest distance between and having a straight electrode and the second diameter resulting in a suitable length for the spark gap.

2. In a separately ignited internal combustion engine as defined in claim 1, an ingition system also including: an additional enclosed chamber between an ignition assembly and the first wall, and a penetration channel which connects an additional enclosed chamber with the ignition chamber.

3. In a separately ignited internal combustion engine as defined in claim 1, wherein a ratio of total volume of ignition chamber to the compression volume of the main combustion chamber amounts to 0.01 to 0.05.

4. In a separately ignited internal combustion engine as defined in claim 3, wherein a ratio of volume of the forward chamber section to the rear chamber section of the ignition chamber amounts to 1.5 to 4.

5. In a separately ignited internal combustion engine as defined in claim 3, wherein a total area of cross-sections of the overflow conduits to the total volume of the ignition chamber amounts to 0.03 to 0.1 cm$^{-1}$.

6. In a separately ignited internal combustion engine as defined in claim 3, wherein a ratio of a cross-sectional area of the forward chamber section to the cross-sectional area of a rear section of the ignition chamber is between 0.2 and 0.5.

7. In a separately ignited internal combustion engine as defined in claim 3, wherein said overflow channels have a diameter and length such that a ratio of the diameter to the length of the overflow channels amounts to 0.8 to 2.

8. In a separately ignited internal combustion engine as defined in claim 7, wherein the diameter of the second overflow channel amounts to 0.8 to 3 mm.

9. In a separately ignited internal combustion engine as defined in claim 8, wherein said overflow channels have respective axes wherein the axes of the first overflow channels diverge 10 to 40 degrees from a middle plane parallel to the main combustion chamber front wall at a location of insertion of the ignition chamber.

10. An ignition chamber for insertion into a first wall of an internal combustion engine having at least one main combustion chamber and operating with externally supplied ignition, having at least one ignition chamber comprising two ignition chamber sections communicating with one another at a transitional zone, of which the rear ignition chamber section has a first diameter and a forward ignition chamber section has a second diameter, which is smaller than the first diameter, and the forward ignition chamber section adjoins a front wall, in which a number of overflow conduits are located, which connect the ignition chamber with the main combustion chamber and of which at least one overflow conduit is oriented at a tangent to the second diameter of the forward ignition chamber section and another overflow conduit is oriented substantially parallel to the longitudinal axis of the rear ignition chamber section, and having an ignition device including;

an electrode embodied in a straight form, which is carried by an insulator protruding with a conical foot into the rear ignition chamber section, wherein said electrode extends into the forward ignition chamber section; and a counterelectrode oriented toward the straight electrode, which counterelectrode is formed in the vicinity of the transitional zone by a circumferential wall of the forward ignition chamber section and from which an ignition spark gap begins and which terminates at the straight electrode, characterized in that the straight electrode is oriented coaxially with the rear ignition chamber section and that the second diameter of the forward ignition chamber section, in the vicinity of the ignition spark gap, is oriented ecentrically relative to the straight electrode, and having a shortest distance between the straight electrode and the second diameter resulting in a suitable length for the spark gap.

11. In a separately ignited internal combustion engine as defined in claim 10, an ignition system also including: an additional enclosed chamber between an ignition assembly and the first wall, and a penetration channel which connects an additional enclosed chamber with the ignition chamber.

12. In a separately ignited internal combustion engine as defined in claim 10, wherein the ignition chamber comprises a spark plug having an exterior connection; a exterior connection is a screw thread on the periphery of the spark plug; and the spark plug narrows conically toward the front wall.

13. In a separately ignited internal combustion engine as defined in claim 12, wherein the first wall is tapered to form a cone seat which engages the front wall.

14. In a separately ignited internal combustion engine as defined in claim 10, wherein a cylindrical chamber section is disposed coaxial to the ignition chamber insert, and wherein a longitudinal extension chamber section is cylindrical and is mounted such that a longitudinal extension chamber section longitudinal axis is parallel and eccentric to the ignition chamber insert longitudinal axis such that the eccentricity of the longitudinal axis determines an ignition spark gap.

15. In a separately ignited internal combustion engine as defined in claim 10, wherein the main combustion chamber is disposed coaxial to the rear ignition chamber section and to the straight electrode, and wherein the forward chamber section is cylindrical and is mounted such that the forward section is at an angle with respect to the straight electrode longitudinal axis such that an axis of the angle determines ignition spark gap.

16. In a separately ignited internal combustion engine as defined in claim 14 or 15, wherein the ignition chamber insert comprises a spark plug with a cylindrical housing section; an exterior connection means is a screw thread on an outside of a housing section; the cylindrical chamber section is arranged coaxial to and within the housing section; and the longitudinal extension chamber section is partially defined by a bowl shaped member wherein the front wall comprises a portion of the bowl shaped member.

17. In a separately ignited internal combustion engine as defined in claim 16, wherein a second overflow channel expands conically toward the main combustion chamber and toward the longitudinal extension chamber section.

18. In a separately ignited internal combustion engine as defined in claim 16, wherein a bowl shaped member longitudinal axis is at an angle to a center electrode longitudinal axis and wherein a third wall comprises an angled phase, such that a portion of the bowl shaped member is within the cylindrical chamber section and the angled phase is parallel to the center electrode longitudinal axis.

19. In a separately ignited internal combustion engine as defined in claim 18, wherein the angle of the bowl shaped member toward the axis of the center electrode amounts to 5° to 30°.

20. In a separately ignited internal combustion engine as defined in claim 18, wherein a ratio of length of the cylindrical chamber section to length of the longitudinal extension chamber section amounts to 0.3 to 1.

21. In a separately ignited internal combustion engine as defined in claim 1 or 10, wherein the straight electrode has a cone which is rounded.

22. In a separately ignited internal combustion engine as defined in claims 1 or 10, wherein a second wall retains heat pipes which contain an evaporable medium which is retained in a capillary structure on a wall of the heat pipes and is evaporable with enhanced heat conductance of said heat pipes at a predetermined pipe temperature.

23. In a separately ignited internal combustion engine as defined in claims 1 or 10, wherein the straight electrode is a heat pipe.

* * * * *